US008873807B2

(12) United States Patent  
Calman et al.

(10) Patent No.: US 8,873,807 B2  
(45) Date of Patent: Oct. 28, 2014

(54) VEHICLE RECOGNITION

(75) Inventors: Matthew A. Calman, Charlotte, NC (US); Erik Stephen Ross, Charlotte, NC (US); Alfred Hamilton, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 379 days.

(21) Appl. No.: 13/342,058

(22) Filed: Jan. 1, 2012

(65) Prior Publication Data

US 2012/0230548 A1 Sep. 13, 2012

Related U.S. Application Data

(60) Provisional application No. 61/450,213, filed on Mar. 8, 2011, provisional application No. 61/478,419, filed on Apr. 22, 2011.

(51) Int. Cl.
*G06K 9/00* (2006.01)
*G06Q 30/06* (2012.01)
*G06Q 40/02* (2012.01)

(52) U.S. Cl.
CPC ........ *G06Q 30/0609* (2013.01); *G06K 9/00791* (2013.01); *G06Q 40/02* (2013.01); *G06K 2209/15* (2013.01)
USPC .......................................... 382/104; 382/103

(58) Field of Classification Search
None
See application file for complete search history.

(56) References Cited

U.S. PATENT DOCUMENTS

| 5,768,633 A | 6/1998 | Allen et al. |
| 6,202,055 B1 | 3/2001 | Houvener et al. |
| 6,522,772 B1 | 2/2003 | Morrison et al. |
| 6,533,392 B1 | 3/2003 | Koitabashi |

(Continued)

FOREIGN PATENT DOCUMENTS

| JP | 2007-266143 | 10/2007 |
| KR | 1020090047614 A | 5/2009 |
| KR | 1020090105734 A | 10/2009 |

OTHER PUBLICATIONS

M.J. Welch (2010). Addressing the Challenges in Underspecification in Web Search. (Order No. 3446833, Univeristy of California, Los Angeles). ProQuest Dissertation and Theses; 137; retrieved from http://search.proquest.com/docview/858101500?accountid=14753. (858101500).
K.J. Jeevan & P. Padhi (2006). A Selective Review of Research in Content Personalization. Library Review, 55(9), 556-586. doi:http:/dx.doi.org/10.1108/00242530610706761.

(Continued)

*Primary Examiner* — Chan Park
*Assistant Examiner* — Iman K Kholdebarin
(74) *Attorney, Agent, or Firm* — Michael A. Springs; Moore & Van Allen PLLC; Nicholas C. Russell (57) ABSTRACT

System, method, and computer program product are provided for using real-time video analysis to provide information about vehicles to a user. Through the user of real-time vision object recognition an image of a vehicle VIN number or a portion of a vehicle may be captured using an image capture device. The VIN number or the portion the vehicle that was captured via the real-time video analysis may be analyzed to determine information about the vehicle. The information may include information about the vehicle, such as the make, model, year, price, vehicle history, and the like. Furthermore, information about the individual's finances, such that an individual may know budgeting of purchasing a vehicle. The information about the vehicle and financial information about purchasing the vehicle is presented to the user.

21 Claims, 6 Drawing Sheets

(56) References Cited

U.S. PATENT DOCUMENTS

| | | | |
|---|---|---|---|
| 6,636,249 B1 | 10/2003 | Rekimoto | |
| 6,674,993 B1 | 1/2004 | Tarbouriech | |
| 6,856,965 B1 | 2/2005 | Stinson et al. | |
| 6,928,165 B1* | 8/2005 | Takai | 380/201 |
| 7,016,532 B2 | 3/2006 | Boncyk et al. | |
| 7,062,454 B1 | 6/2006 | Giannini et al. | |
| 7,110,964 B2 | 9/2006 | Tengler et al. | |
| 7,154,529 B2 | 12/2006 | Hoke et al. | |
| 7,155,228 B2 | 12/2006 | Rappaport et al. | |
| 7,309,015 B2 | 12/2007 | Frantz et al. | |
| 7,403,652 B2 | 7/2008 | Boncyk et al. | |
| 7,412,081 B2 | 8/2008 | Doi | |
| 7,424,303 B2 | 9/2008 | Al-Sarawi | |
| 7,477,780 B2 | 1/2009 | Boncyk et al. | |
| 7,526,280 B2 | 4/2009 | Jung et al. | |
| 7,564,469 B2 | 7/2009 | Cohen | |
| 7,565,008 B2 | 7/2009 | Boncyk et al. | |
| 7,615,446 B2 | 11/2009 | Kim et al. | |
| 7,634,448 B1 | 12/2009 | Ramachandran | |
| 7,680,324 B2 | 3/2010 | Boncyk et al. | |
| 7,693,585 B2 | 4/2010 | Kalan et al. | |
| 7,735,728 B2 | 6/2010 | Wallerstorfer | |
| 7,751,805 B2* | 7/2010 | Neven et al. | 455/414.3 |
| 7,775,437 B2 | 8/2010 | Cohen | |
| 7,792,738 B2 | 9/2010 | Channell | |
| 7,840,031 B2 | 11/2010 | Albertson et al. | |
| 7,873,710 B2* | 1/2011 | Kiley et al. | 709/220 |
| 7,881,243 B2 | 2/2011 | Hardy et al. | |
| 7,881,529 B2 | 2/2011 | Boncyk et al. | |
| 7,899,243 B2 | 3/2011 | Boncyk et al. | |
| 7,899,252 B2 | 3/2011 | Boncyk et al. | |
| 7,962,128 B2 | 6/2011 | Neven et al. | |
| 7,970,649 B2 | 6/2011 | Wu | |
| 7,983,971 B1 | 7/2011 | McLuckie et al. | |
| 7,988,060 B2 | 8/2011 | Killian et al. | |
| 8,121,944 B2 | 2/2012 | Norman et al. | |
| 8,138,930 B1 | 3/2012 | Heath | |
| 8,145,594 B2 | 3/2012 | Geisner et al. | |
| 8,154,428 B2 | 4/2012 | Do et al. | |
| 8,180,377 B2 | 5/2012 | Yang et al. | |
| 8,233,673 B2 | 7/2012 | Britz et al. | |
| 8,385,971 B2 | 2/2013 | Rhoads et al. | |
| 8,392,450 B2 | 3/2013 | Blanchflower et al. | |
| 8,438,110 B2 | 5/2013 | Calman et al. | |
| 8,571,888 B2 | 10/2013 | Calman et al. | |
| 8,698,896 B2* | 4/2014 | Nerayoff et al. | 348/148 |
| 2001/0049653 A1* | 12/2001 | Sheets | 705/38 |
| 2002/0124188 A1 | 9/2002 | Sherman et al. | |
| 2003/0064705 A1 | 4/2003 | Desiderio | |
| 2003/0081934 A1* | 5/2003 | Kirmuss | 386/46 |
| 2003/0081935 A1* | 5/2003 | Kirmuss | 386/46 |
| 2003/0095688 A1* | 5/2003 | Kirmuss | 382/105 |
| 2004/0021584 A1 | 2/2004 | Hartz, Jr. et al. | |
| 2004/0024709 A1 | 2/2004 | Yu et al. | |
| 2004/0088228 A1* | 5/2004 | Mercer et al. | 705/28 |
| 2004/0208372 A1* | 10/2004 | Boncyk et al. | 382/181 |
| 2005/0020359 A1* | 1/2005 | Ackley et al. | 463/31 |
| 2005/0131585 A1* | 6/2005 | Luskin et al. | 701/1 |
| 2005/0137958 A1* | 6/2005 | Huber et al. | 705/37 |
| 2005/0162523 A1 | 7/2005 | Darrell et al. | |
| 2006/0100951 A1 | 5/2006 | Mylet et al. | |
| 2006/0161390 A1* | 7/2006 | Namaky et al. | 702/183 |
| 2006/0229981 A1* | 10/2006 | Crites | 705/40 |
| 2006/0240862 A1* | 10/2006 | Neven et al. | 455/550.1 |
| 2007/0116299 A1* | 5/2007 | Vanderwall et al. | 381/86 |
| 2007/0140595 A1 | 6/2007 | Taylor et al. | |
| 2007/0159522 A1* | 7/2007 | Neven | 348/14.02 |
| 2007/0162971 A1 | 7/2007 | Blom et al. | |
| 2007/0279521 A1 | 12/2007 | Cohen | |
| 2008/0040278 A1 | 2/2008 | DeWitt | |
| 2008/0070198 A1 | 3/2008 | Dempsey | |
| 2008/0214210 A1 | 9/2008 | Rasanen et al. | |
| 2008/0243721 A1 | 10/2008 | Joao | |
| 2008/0252723 A1* | 10/2008 | Park | 348/143 |
| 2008/0267447 A1 | 10/2008 | Kelusky et al. | |
| 2008/0268876 A1 | 10/2008 | Gelfand et al. | |
| 2009/0006191 A1 | 1/2009 | Arankalle et al. | |
| 2009/0061949 A1 | 3/2009 | Chen | |
| 2009/0089131 A1 | 4/2009 | Moukas et al. | |
| 2009/0094125 A1 | 4/2009 | Killian et al. | |
| 2009/0102859 A1 | 4/2009 | Athsani et al. | |
| 2009/0121271 A1 | 5/2009 | Son et al. | |
| 2009/0140839 A1 | 6/2009 | Bishop et al. | |
| 2009/0144164 A1 | 6/2009 | Wane et al. | |
| 2009/0171850 A1 | 7/2009 | Yuval | |
| 2009/0182748 A1 | 7/2009 | Walker | |
| 2009/0204511 A1 | 8/2009 | Tsang | |
| 2009/0237546 A1 | 9/2009 | Bloebaum et al. | |
| 2009/0250515 A1 | 10/2009 | Todd et al. | |
| 2009/0251963 A1 | 10/2009 | Seol et al. | |
| 2010/0002204 A1 | 1/2010 | Jung et al. | |
| 2010/0103241 A1* | 4/2010 | Linaker | 348/14.02 |
| 2010/0130226 A1 | 5/2010 | Arrasvuori et al. | |
| 2010/0185529 A1 | 7/2010 | Chesnut et al. | |
| 2010/0228776 A1 | 9/2010 | Melkote et al. | |
| 2010/0250581 A1 | 9/2010 | Chau | |
| 2010/0255795 A1 | 10/2010 | Rubinsky et al. | |
| 2010/0260373 A1* | 10/2010 | Neven et al. | 382/100 |
| 2010/0277412 A1 | 11/2010 | Pryor | |
| 2010/0281432 A1 | 11/2010 | Geisner et al. | |
| 2010/0306712 A1 | 12/2010 | Snook et al. | |
| 2010/0306715 A1 | 12/2010 | Geisner et al. | |
| 2011/0022540 A1 | 1/2011 | Stern et al. | |
| 2011/0034176 A1 | 2/2011 | Lord et al. | |
| 2011/0077046 A1 | 3/2011 | Durand et al. | |
| 2011/0079639 A1 | 4/2011 | Khan | |
| 2011/0106622 A1 | 5/2011 | Kuhlman et al. | |
| 2011/0119155 A1 | 5/2011 | Hammad et al. | |
| 2011/0153341 A1* | 6/2011 | Diaz-Cortes | 705/2 |
| 2011/0202460 A1 | 8/2011 | Buer et al. | |
| 2011/0202466 A1 | 8/2011 | Carter | |
| 2012/0100915 A1 | 4/2012 | Margalit et al. | |
| 2012/0229629 A1* | 9/2012 | Blumstein-Koren et al. | 348/143 |
| 2012/0230548 A1* | 9/2012 | Calman et al. | 382/104 |
| 2012/0287278 A1* | 11/2012 | Danis | 348/148 |
| 2012/0330753 A1 | 12/2012 | Urbanski et al. | |
| 2013/0011111 A1 | 1/2013 | Abraham et al. | |
| 2013/0116855 A1* | 5/2013 | Nielsen et al. | 701/1 |
| 2013/0259313 A1* | 10/2013 | Breed et al. | 382/104 |
| 2014/0098993 A1* | 4/2014 | Boncyk et al. | 382/103 |

OTHER PUBLICATIONS

P.A. Lessner (2007). Chi-thinking: Chiasmus and Cognition. (Order No. 3297307, University of Maryland, College Park). ProQuest Disserations and Theses; 487; retrieved from http://search.proquest.com/docview/304851937?accountid=14753. (304851937).

International Preliminary Examination Report for International Application No. PCT/US12/27892 dated Sep. 10, 2013; 9 pages.

International Preliminary Examination Report for International Application No. PCT/US2012/027890 dated Sep. 10, 2013; 6 pages.

International Preliminary Examination Report for International Application No. PCT/US12/28036 dated Sep. 10, 2013; 5 pages.

International Preliminary Examination Report for International Application No. PCT/US12/28008 dated Sep. 10, 2013; 7 pages.

International Preliminary Examination Report for International Application No. PCT/US12/27912 dated Sep. 10, 2013; 6 pages.

International Search Report and Written Opinion for International Application No. PCT/US12/27890 mailed Feb. 5, 2013.

PCT International Search Report and Written Opinion for International Application No. PCT/US 12/28008 date May 22, 2012.

PCT International Search Report and Written Opinion for International Application No. PCT/US 12/28036 dated May 28, 2012.

PCT International Search Report and Written Opinion for International Application No. PCT/US2012/027912 dated Jun. 8, 2012.

PCT International Search Report and Written Opinion for International Application No. PCT/US 12/27892 dated Jun. 14, 2012.

International Search Report and Written Opinion dated Oct. 12, 2012 for International Application No. PCT/US1248697.

PCT International Preliminary Report on Patentability (IPRP) for International Application No. PCT/US2012/048697 dated Feb. 4, 2014.

* cited by examiner

VEHICLE RECOGNITION

CROSS-REFERENCE TO RELATED APPLICATIONS

This application claims priority to U.S. Provisional Patent Application Ser. No. 61/450,213, filed Mar. 8, 2011, entitled "Real-Time Video Image Analysis Applications for Commerce Activity" and U.S. Provisional Patent Application Ser. No. 61/478,419, filed Apr. 22, 2011, entitled "Vehicle Recognition," the entirety of each of which is incorporated herein by reference.

BACKGROUND

Modern handheld mobile devices, such as smart phones or the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have addition features that are becoming increasing more common and standardized features. Such features include, but are not limited to, location-determining devices, such as Global Positioning System (GPS) devices; sensor devices, such as accelerometers; and high-resolution video cameras.

As the hardware capabilities of such mobile devices have increased, so too have the applications (i.e., software) that rely on the hardware advances. Yet, although mobile devices have cameras to capture images, the mobile devices' software is not advanced to process images, especially those that are real-time. Such software also does not provide any connection between real-time images and financial information of the user.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus systems and computer program products are described herein that provide for using real-time video analysis, such as AR or the like to assist the user of mobile devices with providing the user information relating to a vehicle. Through the use real-time vision object recognition objects, logos, artwork, products, locations and other features that can be recognized in the real-time video stream can be matched to data associated with such to assist the user with vehicle recognition and providing the user specific information relating to the specific vehicle of interest. In specific embodiments, the data that is matched to the images in the real-time video stream is specific to financial institutions, such as customer financial behavior history, customer purchase power/transaction history and the like. In this regard, many of the embodiments herein disclosed leverage financial institution data, which is uniquely specific to financial institution, in providing information to mobile device users in connection with real-time video stream analysis.

To the accomplishment of the foregoing and related ends, the one or more embodiments comprise the features herein-after fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

According to an embodiment, an image capture device is positioned to view at least a portion of a vehicle. An image of at least a portion the vehicle is captured and information about the vehicle is determined based on the image. Such information is presented to the user.

According to embodiments, the information is details about the vehicle, such as a car history report, wreckage information, general features about the car, and the like. According to other embodiments, the information relates to financial information a user may desire to know when the user is looking to buy the car, such as how much a vehicle loan would be and/or how much buying the vehicle will impact the user's budget. Other embodiments are discussed and are within the scope of this application.

Embodiments of the invention relate to systems, methods, and computer program products for vehicle recognition comprising: identifying an image of the at least a portion of a vehicle in proximate location to a mobile device of a user; receiving, via the mobile device, the image of the at least a portion of the vehicle; determining information about the vehicle based on the image of the at least a portion of the vehicle; and presenting the information about the vehicle to a user, via the mobile device.

In some embodiments, the information about the vehicle comprises information about the make, model, and price of the vehicle. The information about the vehicle may also comprise information about the maintenance history of the vehicle. The information about the vehicle may also include information relating to user financial data.

In some embodiments, the invention further comprises analyzing the user financial data compared to the information about the price of the vehicle to determine the user's ability to afford purchasing the vehicle.

In some embodiments, identifying an image of the at least a portion of the vehicle further comprises capturing real-time video stream of the at least a portion of the vehicle. Identifying the image of the at least a portion of the vehicle may further comprise capturing an image of the VIN number of the vehicle. Identifying the image of the at least a portion of the vehicle may still further comprise capturing an image of a portion of the exterior of the vehicle. Identifying the image of the at least a portion of the vehicle may further comprise capturing an image of a portion of the interior of the vehicle.

In some embodiments, presenting the information about the vehicle to the user comprises superimposing the information about the vehicle over the vehicle over real-time video that is capture by the mobile device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

The present application is related to object recognition and augmented reality (AR) presentment associated with vehicle identification. Object recognition and AR technology analyzes real-time video data, location data, compass direction data and the like in combination with information related to the objects, locations or the like in the video stream to create browse-able "hot-spots" or "tags" that are superimposed on the mobile device display, resulting in an experience described as "reality browsing". As discussed later with regard to the figures, AR can be applied to vehicle recognition and processes/systems related thereto.

Thus, methods, systems, computer programs and the like are herein disclosed that provide for using real-time video analysis or the like to assist the user of mobile devices with identifying vehicles and services related thereto. Through the use real-time vision object recognition, objects, logos, artwork, products, locations and other features that can be recognized in the real-time video stream can be matched to data associated with such to assist the user with vehicle recognition and determining information and/or services which may be beneficial based on such vehicle recognition. In specific embodiments, the data that is matched to the images in the real-time video stream is specific to financial institutions, such as customer financial behavior history, customer purchase power/transaction history and the like. In this regard, many of the embodiments herein disclosed leverage financial institution data, which is uniquely specific to financial institution, in providing information to mobile devices users in connection with real-time video stream analysis. More specific embodiments are disclosed below with regard to FIGS. 1-5.

While embodiments discussed herein are generally described with respect to "real-time video streams" or "real-time video" it will be appreciated that the video stream may be captured and stored for later viewing and analysis. Indeed, in some embodiments video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take a still picture of the environment to be analyzed immediately or at a later time. Embodiments in which real-time video, recorded video or still pictures are analyzed are contemplated herein.

Figure 1:
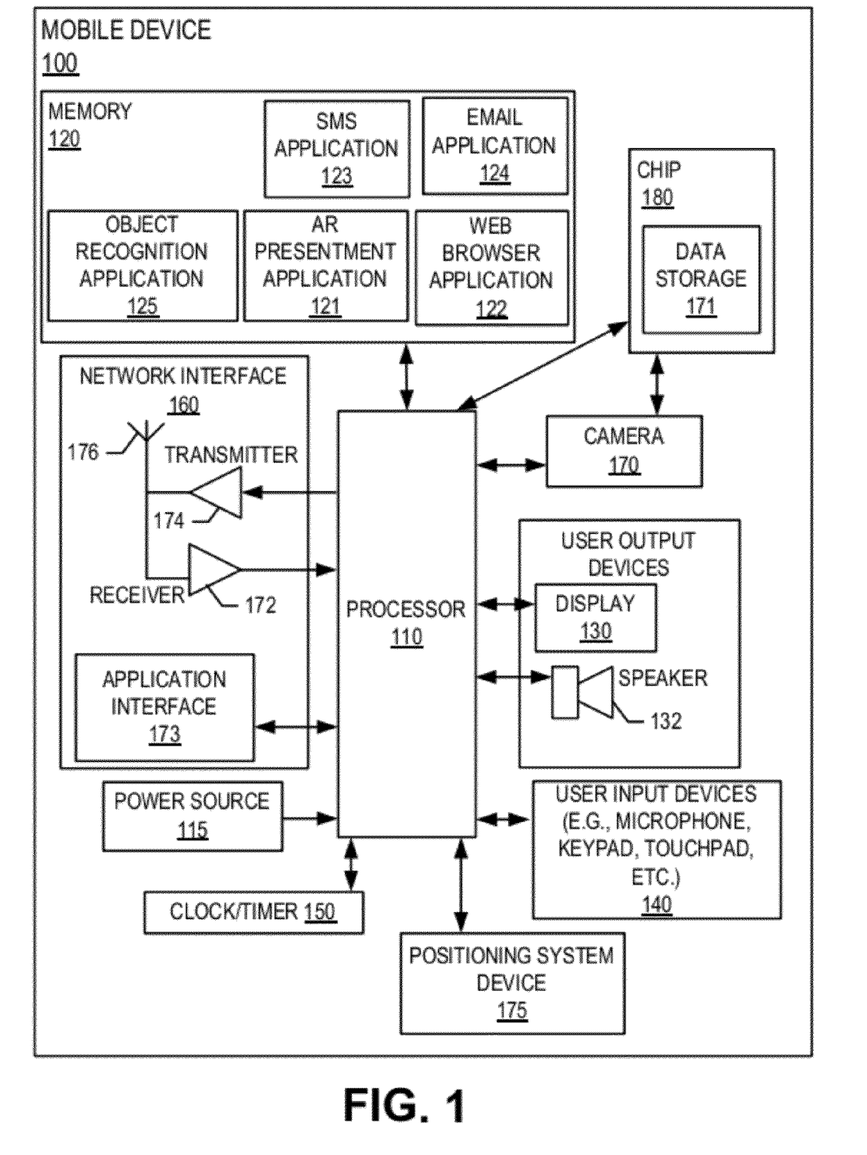
FIG. 1 is a block diagram illustrating a mobile device, in accordance with an embodiment of the invention.

FIG. 1 illustrates an embodiment of a mobile device 100 that may be configured to execute object recognition and AR functionality. A "mobile device" 100 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 100 may generally include a processor 110 communicably coupled to such devices as a memory 120, user output devices 136, user input devices 140, a network interface 160, a power source 115, a clock or other timer 150, a camera 170, a positioning system device 175, one or more chips 180, etc In some embodiments, the mobile device and/or the server access one or more databases or datastores (not shown) to search for and/or retrieve information related to the object and/or marker. In some embodiments, the mobile device and/or the server access one or more datastores local to the mobile device and/or server and in other embodiments, the mobile device and/or server access datastores remote to the mobile device and/or server. In some embodiments, the mobile device and/or server access both a memory and/or a datastore local to the mobile device and/or server as well as a datastore remote from the mobile device and/or server.

The processor 110, and other processors described herein, may generally include circuitry for implementing communication and/or logic functions of the mobile device 100. For example, the processor 110 may include a digital signal processor device, a microprocessor device, and various analog to digital converters, digital to analog converters, and/or other support circuits. Control and signal processing functions of the mobile device 100 may be allocated between these devices according to their respective capabilities. The processor 110 thus may also include the functionality to encode and interleave messages and data prior to modulation and transmission. The processor 110 may additionally include an internal data modem. Further, the processor 110 may include functionality to operate one or more software programs or applications, which may be stored in the memory 120. For example, the processor 110 may be capable of operating a connectivity program, such as a web browser application 122. The web browser application 122 may then allow the mobile device 100 to transmit and receive web content, such as, for example, location-based content and/or other web page content, according to a Wireless Application Protocol (WAP), Hypertext Transfer Protocol (HTTP), and/or the like.

The processor 110 may also be capable of operating applications, such as an object recognition application 125 and/or an AR presentment application 121. The object recognition application 125 and/or the AR presentment application 121 may be downloaded from a server and stored in the memory 120 of the mobile device 100. Alternatively, the object recognition application 125 and/or the AR presentment application 121 may be pre-installed and stored in a memory in the chip 180. In such an embodiment, the user may not need to download the object recognition application 125 and/or the AR presentment application 121 from a server.

In some embodiments, the processor 110 may also be capable of operating one or more applications, such as one or more applications functioning as an artificial intelligence ("AI") engine. The object recognition application 125 may recognize objects that it has identified in prior uses by way of the AI engine. In this way, the object recognition application 125 may recognize specific objects and/or classes of objects, and store information related to the recognized objects in one or more memories and/or databases discussed herein. Once the AI engine utilizing the object recognition application 125 has thereby "learned" of an object and/or class of objects, the AI engine and/or the object recognition application 125 may run concurrently with and/or collaborate with other modules or applications described herein to perform the various steps of the methods discussed. For example, in some embodiments, the AI engine recognizes an object that has been recognized before and stored by the AI engine. The AI engine and/or the object recognition application 125 may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object The chip 180 may include the necessary circuitry to provide the object recognition and/or AR functionality to the mobile device 100. Generally, the chip 180 will include data storage 171 which may include data associated with the objects within a real-time video stream that the object recognition application 125 and/or the AR presentment application 121 identifies as having a certain marker(s). The chip 180 and/or data storage 171 may be an integrated circuit, a microprocessor, a system-on-a-chip, a microcontroller, or the like. As discussed above, in one embodiment, the chip 180 may provide the object recognition and/or the AR functionality to the mobile device 100.

The object recognition application 125 provides the mobile device 100 with object recognition capabilities. In this way, objects such as products and/or the like may be recognized by the object itself and/or markers associated with the objects. In this way the object recognition application 125 may communicate with other devices on the network to determine the object within the real-time video stream.

The AR presentment application 121 provides the mobile device 100 with AR capabilities. In this way, the AR presentment application 121 may provide superimposed indicators related to the object in the real-time video stream, such that the user may have access to the targeted offers by selecting an indicator superimposed on the real-time video stream. The AR presentment application 121 may communicate with the other devices on the network to provide the user with indications associated with targeted offers for objects in the real-time video display.

Of note, while FIG. 1 illustrates the Chip 180 as a separate and distinct element within the mobile device 100, it will be apparent to those skilled in the art that the Chip 180 functionality may be incorporated within other elements in the mobile device 100. For instance, the functionality of the Chip 180 may be incorporated within the mobile device memory 120 and/or processor 110. In a particular embodiment, the functionality of the Chip 180 is incorporated in an element within the mobile device 100 that provides AR capabilities to the mobile device 100. Still further, the Chip 180 functionality may be included in a removable storage device such as an SD card or the like.

The processor 110 may be configured to use the network interface 160 to communicate with one or more other devices on a network. In this regard, the network interface 160 may include an antenna 176 operatively coupled to a transmitter 174 and a receiver 172 (together a "transceiver"). The processor 110 may be configured to provide signals to and receive signals from the transmitter 174 and receiver 172, respectively. The signals may include signaling information in accordance with the air interface standard of the applicable cellular system of the wireless telephone network that may be part of the network. In this regard, the mobile device 100 may be configured to operate with one or more air interface standards, communication protocols, modulation types, and access types. By way of illustration, the mobile device 100 may be configured to operate in accordance with any of a number of first, second, third, and/or fourth-generation communication protocols and/or the like. For example, the mobile device 100 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 100 may also be configured to operate in accordance with non-cellular communication mechanisms, such as via a wireless local area network (WLAN) or other communication/data networks.

The network interface 160 may also include an application interface 173 in order to allow a user to execute some or all of the above-described processes with respect to the object recognition application 125, AR presentment application 121, and/or the chip 180. The application interface 173 may have access to the hardware, e.g., the transceiver, and software previously described with respect to the network interface 160. Furthermore, the application interface 173 may have the ability to connect to and communicate with an external data storage on a separate system within the network.

As described above, the mobile device 100 may have a user interface that includes user output devices 136 and/or user input devices 140. The user output devices 136 may include a display 130 (e.g., a liquid crystal display (LCD) or the like) and a speaker 132 or other audio device, which are operatively coupled to the processor 110. The user input devices 140, which may allow the mobile device 100 to receive data from a user 110, may include any of a number of devices allowing the mobile device 100 to receive data from a user, such as a keypad, keyboard, touch-screen, touchpad, microphone, mouse, joystick, other pointer device, button, soft key, and/or other input device(s).

The mobile device 100 may further include a power source 115. Generally, the power source 115 is a device that supplies electrical energy to an electrical load. In one embodiment, power source 115 may convert a form of energy such as solar energy, chemical energy, mechanical energy, etc. to electrical energy. Generally, the power source 115 in a mobile device 100 may be a battery, such as a lithium battery, a nickel-metal hydride battery, or the like, that is used for powering various circuits, e.g., the transceiver circuit, and other devices that are used to operate the mobile device 100. Alternatively, the power source 115 may be a power adapter that can connect a power supply from a power outlet to the mobile device 100. In such embodiments, a power adapter may be classified as a power source "in" the mobile device.

The mobile device 100 may also include a memory 120 operatively coupled to the processor 110. As used herein, memory may include any computer readable medium configured to store data, code, or other information. The memory 120 may include volatile memory, such as volatile Random Access Memory (RAM) including a cache area for the temporary storage of data. The memory 120 may also include non-volatile memory, which can be embedded and/or may be removable. The non-volatile memory may additionally or alternatively include an electrically erasable programmable read-only memory (EEPROM), flash memory or the like.

The memory 120 may store any of a number of applications or programs which comprise computer-executable instructions/code executed by the processor 110 to implement the functions of the mobile device 100 described herein. For example, the memory 120 may include such applications as an AR presentment application 121, a web browser application 122, an SMS application, an email application 124, etc. In some embodiments, the information provided by the real-time video stream may be compared to data provided to the system through an API. In this way, the data may be stored in a separate API and be implemented by request from the mobile device and/or server accesses another application by way of an API.

Figure 2:
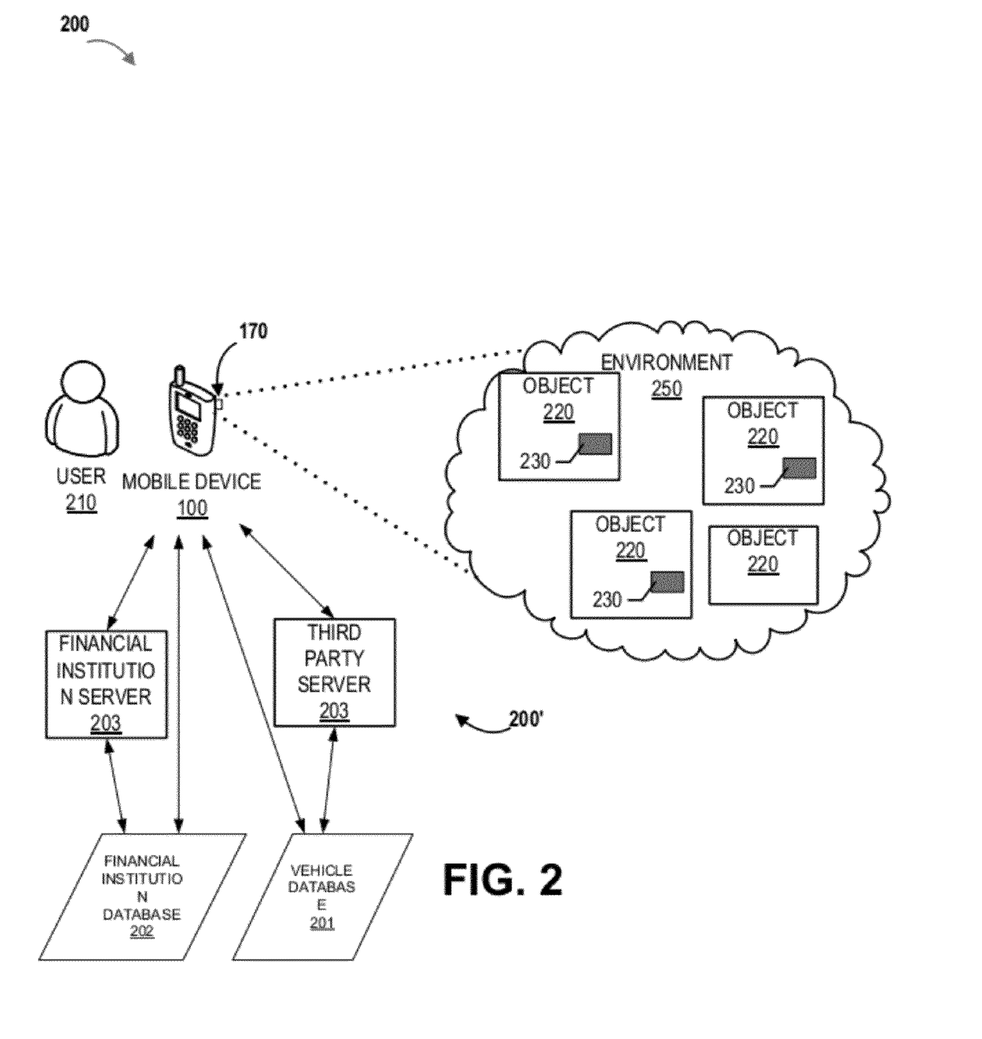
FIG. 2 is a block diagram illustrating an environment, in accordance with an embodiment of the invention.

Referring to FIG. 2, a block diagram illustrating an environment 200 in which a user 210 utilizes a mobile device 100 to capture real-time video of an environment 250 is shown. As denoted earlier, the mobile device 100 may be any mobile communication device. The mobile device 100 has the capability of capturing real-time video of the surrounding environment 250. The real-time video capture may be by any means known in the art. In one particular embodiment, the mobile device 100 is a mobile telephone equipped with a camera 170 capable of video capture.

The environment 250 contains a number of objects 240. Some of such objects 240 may include a marker 230 identifiable to the mobile device 100. A marker 230 may be any type of marker that is a distinguishing feature that can be interpreted by the mobile device 100 to identify specific objects 220. For instance, a marker may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, etc. In one embodiment, the marker 230 is a WIN number on a vehicle. In some embodiments, the marker 230 may be audio and the mobile device 100 may be capable of utilizing audio recognition to identify words or unique sounds broadcast. The marker 230 may be any size, shape, etc. Indeed, in some embodiments, the marker 230 may be very small relative to the object 220 such as the alpha-numeric characters that identify the name or model of an object 220, whereas, in other embodiments, the marker 230 is the entire object 220 such as the unique shape, size, structure, etc.

In some embodiments, the marker 230 is not actually a physical marker located on or being broadcast by the object 220. For instance, the marker 230 may be some type of identifiable feature that is an indication that the object 220 is nearby. In some embodiments, the marker 230 for an object 220 may actually be the marker 230 for a different object 220. For example, the mobile device 100 may recognize a particular building as being "Building A." Data stored in the data storage 371 may indicate that "Building B" is located directly to the east and next to "Building A." Thus, marker 230 for an object 220 that are not located on or being broadcast by the object 220 are generally based on fixed facts about the object 220 (e.g., "Building B" is next to "Building A"). However, it is not a requirement that such a marker 230 be such a fixed fact. The marker 230 may be anything that enables the mobile device 100 to interpret to a desired confidence level what the object is. For example, the mobile device 100, object recognition application 125 and/or AR presentation application 121 may be used to identify a particular person as a first character from a popular show, and thereafter utilize the information that the first character is nearby features of other characters to interpret that a second character, a third character, etc. are nearby, whereas without the identification of the first character, the features of the second and third characters may not have been used to identify the second and third characters. This example may also be applied to objects outside of people.

The marker 230 may also be, or include, social network data, such as data retrieved or communicated from the Internet, such as tweets, blog posts, social networking site posts, various types of messages and/or the like. In other embodiments, the marker 230 is provided in addition to social network data as mentioned above. For example, mobile device 100 may capture a video stream and/or one or more still shots of a large gathering of people. In this example, as above, one or more people dressed as characters in costumes may be present at a specified location. The mobile device 100, object recognition application 125, and/or the AR presentation application 121 may identify several social network indicators, such as posts, blogs, tweets, messages, and/or the like indicating the presence of one or more of the characters at the specified location. In this way, the mobile device 100 and associated applications may communicate information regarding the social media communications to the user and/or use the information regarding the social media communications in conjunction with other methods of object recognition. For example, the mobile device 100 object recognition application 125, and/or the AR presentation application 121 performing recognition of the characters at the specified location may confirm that the characters being identified are in fact the correct characters based on the retrieved social media communications. This example may also be applied objects outside of people.

In some embodiments, the mobile device and/or server accesses one or more other servers, social media networks, applications and/or the like in order to retrieve and/or search for information useful in performing an object recognition. In some embodiments, the mobile device and/or server accesses another application by way of an application programming interface or API. In this regard, the mobile device and/or server may quickly search and/or retrieve information from the other program without requiring additional authentication steps or other gateway steps.

While FIG. 2 illustrates that the objects 220 with markers 230 only include a single marker 230, it will be appreciated that the object 220 may have any number of markers 230 with each equally capable of identifying the object 220. Similarly, multiple markers 230 may be identified by the mobile device 100 such that the combination of the markers 230 may be utilized to identify the object 220. For example, the facial recognition may identify a person as a famous athlete, and thereafter utilize the uniform the person is wearing to confirm that it is in fact the famous athlete.

In some embodiments, a marker 230 may be the location of the object 220. In such embodiments, the object recognition application 125 may utilize GPS software to determine the location of the user 210. As noted above, a location-based marker 230 could be utilized in conjunction with other non-location-based markers 230 identifiable and recognized by the object recognition application 125 to identify the object 230. However, in some embodiments, a location-based marker 230 may be the only marker 230. For instance, in such embodiments, the object recognition application 125 may utilize GPS software to determine the location of the user 210 and a compass device or software to determine what direction the mobile device 100 is facing in order to identify the object 220. In still further embodiments, the object recognition application 125 does not utilize any GPS data in the identification. In such embodiments, markers 230 utilized to identify the object 220 are not location-based.

Figure 3:
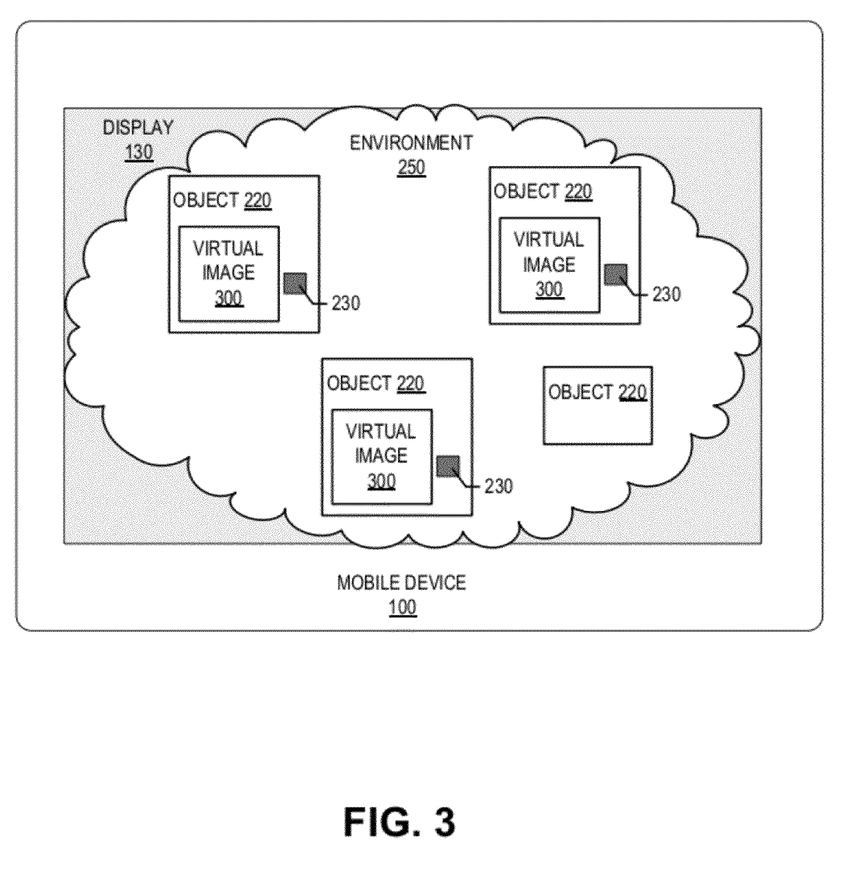
FIG. 3 is a block diagram illustrating a mobile device, in accordance with an embodiment of the invention.

FIG. 3 illustrates a mobile device 100 wherein the user 210 has executed an object recognition application 125, AR presentment application 121, and a real-time video capture device (e.g., camera 170) is utilized to display the surrounding environment 250 on the display 130 of the mobile device 100. The object recognition application 125 is configured to utilize markers 230 to identify objects 220, such as VIN numbers on a vehicle or the make/model of a car, and indicate to the user 210 identified objects 220 by displaying a virtual image 300 on the mobile device display 130. As illustrated, if an object 220 does not have any markers 230 (or at least enough markers 230 to yield object identification), the object 220 will be displayed without an associated virtual image 300.

The object recognition application 125 may use any type of means in order to identify desired objects 220. For instance, the object recognition application 125 may utilize one or more pattern recognition algorithms to analyze objects in the environment 250 and compare with markers 230 in data storage 171 which may be contained within the mobile device 100 (such as within chip 180) or externally on a separate system accessible via the connected network. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like. For example, the marker 230 may be a make/model of a vehicle and the object recognition application 125 may automatically recognize the make/model/year of the vehicle based on the shape, size, color, features, and the like of the vehicle. The marker 230, such as a VIN number, may contain or be text, and as such, the mobile device could include a module to extract the text using optical character recognition ("OCR") routines. Such text can then be used, such as in the present example of a VIN number, the VIN number, after extraction, can be used to identify a particular vehicle and to gather various information about that vehicle, such as the owner's name, etc.

Upon identifying an object 220 within the real-time video stream, the AR presentment application 121 is configured to superimpose a virtual image 300 on the mobile device display 130. The virtual image 300 is generally a tab or link displayed such that the user 210 may "select" the virtual image 300 and retrieve information related to the identified object. The information may include any desired information associated with the selected object and may range from basic information to greatly detailed information. In some embodiments, the virtual image 300 may provide the user 210 with an internet hyperlink to further information on the object 220. The information may include, for example, all types of media, such as text, images, clipart, video clips, movies, or any other type of information desired. In yet other embodiments, the virtual image 300 information related to the identified object may be visualized by the user 210 without "selecting" the virtual image 300.

In embodiments in which the virtual image 300 provides an interactive tab to the user 210, the user 210 may select the virtual image 300 by any conventional means for interaction with the mobile device 100. For instance, in some embodiments, the user 210 may utilize an input device 140 such as a keyboard to highlight and select the virtual image 300 in order to retrieve the information. In a particular embodiment, the mobile device display 130 includes a touch screen that the user may employ to select the virtual image 300 utilizing the user's finger, a stylus, or the like.

In some embodiments, the virtual image 300 is not interactive and simply provides information to the user 210 by superimposing the virtual image 300 onto the display 130. For example, in some instances it may be beneficial for the AR presentment application 121 to merely identify an object 220, just identify the object's name/title, give brief information about the object, etc., rather than provide extensive detail that requires interaction with the virtual image 300. The mobile device 100 is capable of being tailored to a user's desired preferences.

Furthermore, the virtual image 300 may be displayed at any size on the mobile device display 130. The virtual image 300 may be small enough that it is positioned on or next to the object 220 being identified such that the object 220 remains discernable behind the virtual image 220. Additionally, the virtual image 300 may be semi-transparent such that the object 220 remains discernable behind the virtual image. In other embodiments, the virtual image 220 may be large enough to completely cover the object 220 portrayed on the display 130. Indeed, in some embodiments, the virtual image 220 may cover a majority or the entirety of the mobile device display 130.

The user 210 may opt to execute the object recognition application 125 and/or the AR presentment application 121 at any desired moment and begin video capture and analysis. However, in some embodiments, the object recognition application 125 and/or the AR presentment application 121 includes an "always on" feature in which the mobile device 100 is continuously capturing video and analyzing the objects 220 within the video stream. In such embodiments, the object recognition application 125 and/or the AR presentment application 121 may be configured to alert the user 210 that a particular object 220 has been identified. The user 210 may set any number of user preferences to tailor the experience 200 to their needs. For instance, the user 220 may opt to only be alerted if a certain particular object 220 is identified. Additionally, it will be appreciated that the "always on" feature in which video is continuously captured may consume the mobile device power source 115 more quickly. Thus, in some embodiments, the "always on" feature may disengage if a determined event occurs such as low power source 115, low levels of light for an extended period of time (e.g., such as if the mobile device 100 is in a user's pocket obstructing a clear view of the environment 250 from the mobile device 100), if the mobile device 100 remains stationary (thus receiving the same video stream) for an extended period of time, the user sets a certain time of day to disengage, etc. Conversely, if the "always on" feature is disengaged due to the occurrence of such an event, the user 210 may opt for the "always on" feature to re-engage after the duration of the disengaging event (e.g., power source 115 is re-charged, light levels are increased, etc.).

In some embodiments, the user 210 may identify objects 220 that the object recognition application 125 does not identify and add it to the data storage 171 with desired information in order to be identified and/or displayed in the future. For instance, the user 210 may select an unidentified object 220 and enter a name/title and/or any other desired information for the unidentified object 220. In such embodiments, the object recognition application 125 may detect/record certain markers 230 about the object so that the pattern recognition algorithm(s) (or other identification means) may detect the object 220 in the future. Furthermore, in cases where the object information is within the data storage 171, but the object recognition application 125 fails to identify the object 220 (e.g., one or more identifying characteristics or markers 230 of the object has changed since it was added to the data storage 171 or the marker 230 simply was not identified), the user 210 may select the object 220 and associate it with an object 220 already stored in the data storage 171. In such cases, the object recognition application 125 may be capable of updating the markers 230 for the object 220 in order to identify the object in future real-time video streams.

In addition, in some embodiments, the user 210 may opt to edit the information or add to the information provided by the virtual object 300. For instance, the user 210 may opt to include user-specific information about a certain object 220 such that the information may be displayed upon a future identification of the object 220. Conversely, in some embodiments, the user may opt to delete or hide an object 220 from being identified and a virtual object 300 associated therewith being displayed on the mobile device display 130.

Furthermore, in some instances, an object 220 may include one or more markers 230 identified by the object recognition application 125 that leads the object recognition application 125 to associate an object with more than one object in the data storage 171. In such instances, the user 210 may be presented with the multiple candidate identifications and may opt to choose the appropriate identification or input a different identification. The multiple candidates may be presented to the user 210 by any means. For instance, in one embodiment, the candidates are presented to the user 210 as a list wherein the "strongest" candidate is listed first based on reliability of the identification. Upon input by the user 210 identifying the object 220, the object recognition application 125 and/or the AR presentment application 121 may "learn" from the input and store additional markers 230 in order to avoid multiple identification candidates for the same object 220 in future identifications.

Additionally, the object recognition application 125 may utilize other metrics for identification than identification algorithms. For instance, the object recognition application 125 may utilize the user's location, time of day, season, weather, speed of location changes (e.g., walking versus traveling), "busyness" (e.g., how many objects are in motion versus stationary in the video stream), as well any number of other conceivable factors in determining the identification of objects 220. Moreover, the user 210 may input preferences or other metrics for which the object recognition application 125 may utilize to narrow results of identified objects 220.

In some embodiments, the object recognition application 125 and/or the AR presentment application 121 may have the ability to gather and report user interactions with displayed virtual objects 300. The data elements gathered and reported may include, but are not limited to, number of offer impressions; time spent "viewing" an offer, product, object or business; number of offers investigated via a selection; number of offers loaded to an electronic wallet and the like. Such user interactions may be reported to any type of entity desired. In one particular embodiment, the user interactions may be reported to a financial institution and the information reported may include customer financial behavior, purchase power/transaction history, and the like.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/or pointers in order to more quickly retrieve information regarding the object. In some embodiments, the mobile device provides the user an opportunity to post messages, links to information or the like and associate such postings with the object. Subsequent users may then be presenting such postings when their mobile devices capture and recognize an object. In some embodiments, the information gathered through the recognition and information retrieval process may be posted by the user in association with the object. Such tags and/or postings may be stored in a predetermined memory and/or database for ease of searching and retrieval.

Figure 4A:
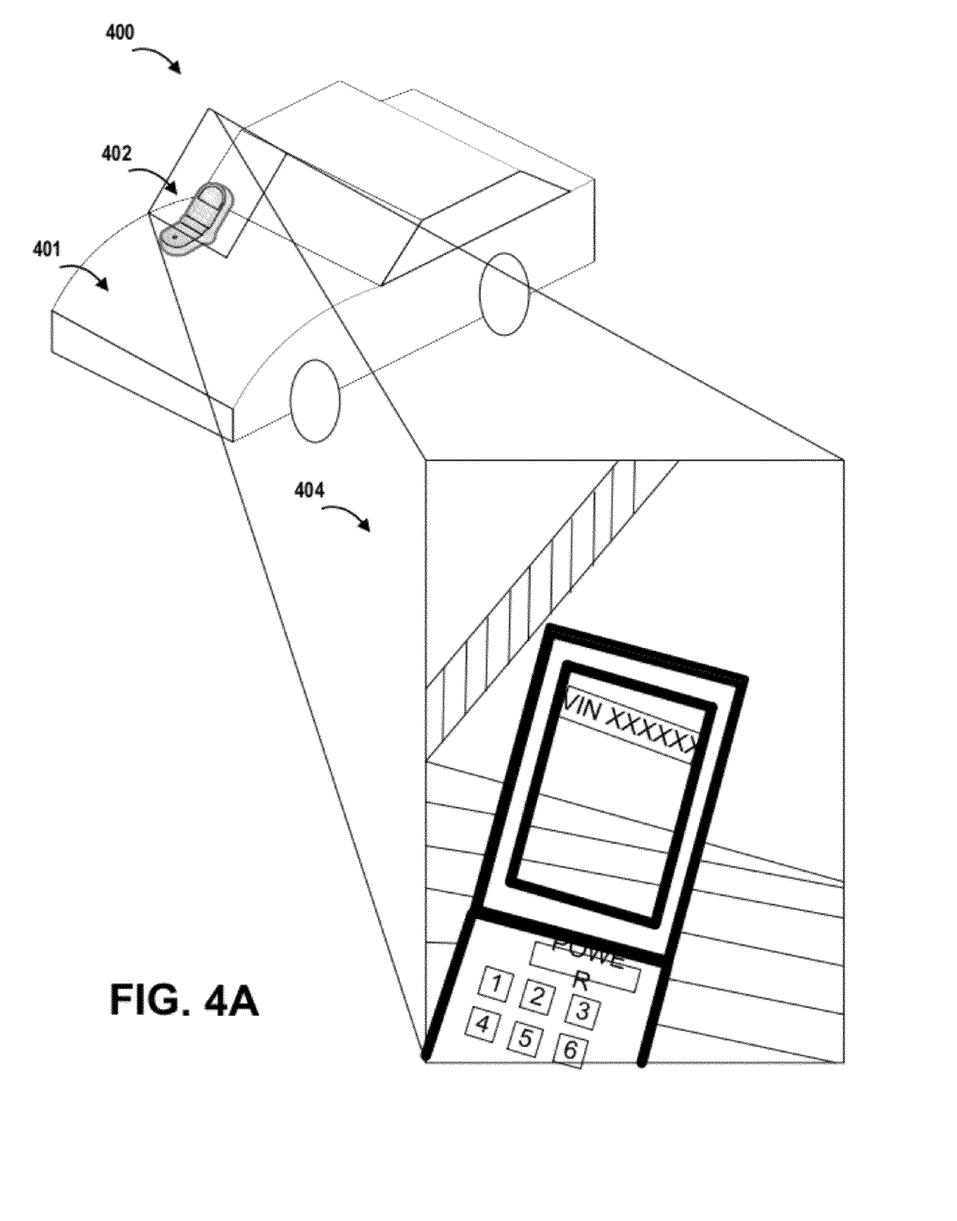
FIGS. 4A-C are diagrams illustrating various embodiments of a mobile device capturing images (including any text) of a vehicle.
Figure 4B:
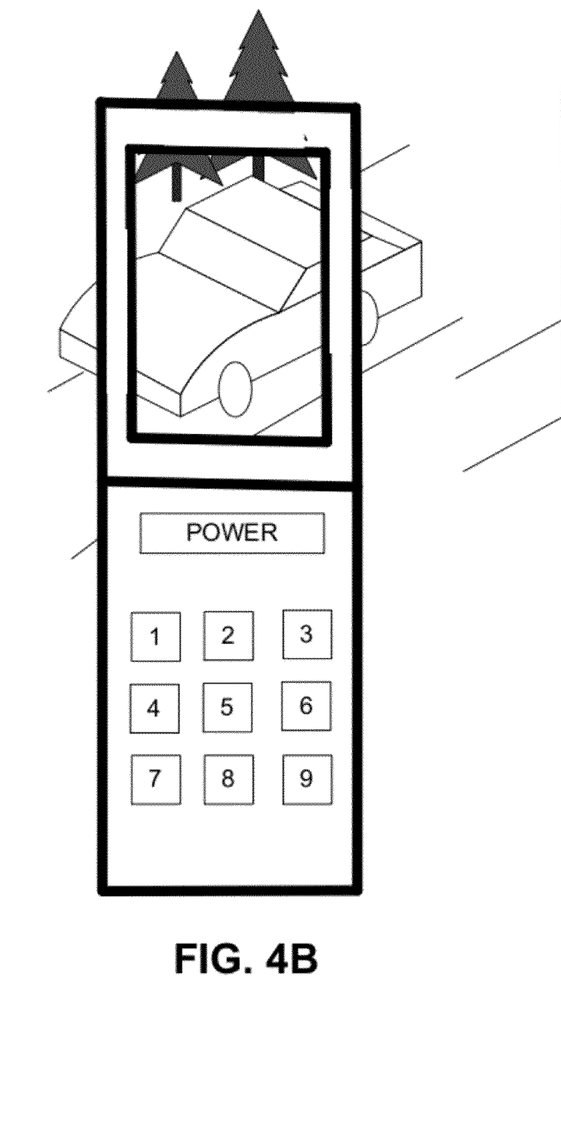
Figure 4C:
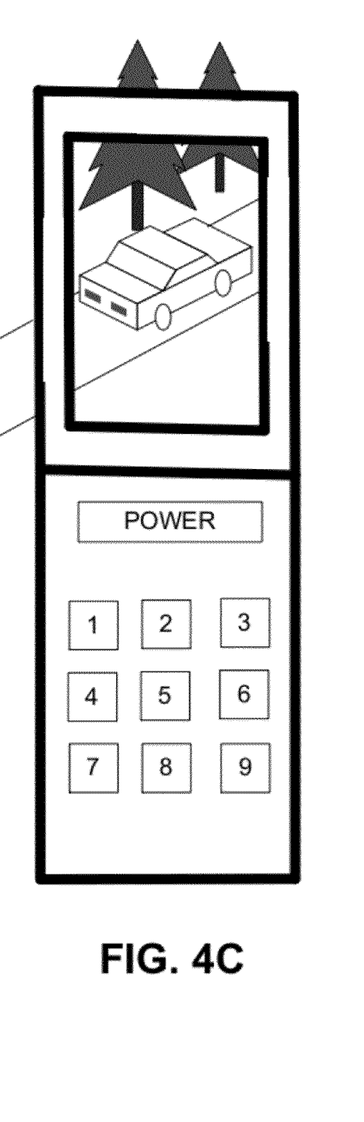

FIGS. 4A-C are diagrams illustrating various embodiments of a mobile device 402 capturing images (including any text) of a vehicle. In FIG. 4A, the mobile device 402 is shown capturing a vehicle's identification number ("VIN"). In FIG. 4A, a system 400 shows a vehicle 401 and the mobile device 402 positioned over the front windshield of the vehicle 401. A blowup 404 of the mobile device 402 positioned over the front windshield shows a close up view of the image capture of the mobile device 402. Specifically, in this embodiment, the mobile device 402 is capturing the VIN number of the vehicle. The VIN number is shown on the dashboard of the vehicle, which is viewed through the vehicle's windshield. This is a real-time video capture or a real-time image capture and can be performed using the camera or video capture device of the mobile device (e.g., a cellular telephone or smartphone). In this way the mobile device 402 may determine the VIN number of the vehicle by capturing the VIN number in a real-time video stream. The system may be able to associate the VIN number with a particular vehicle and provide a user with data associated with that vehicle.

It should be understood that the vehicle can be a car, truck, SUV, boat, airplane, equipment, or the like that has a VIN number. In other embodiments, the present invention could also work with machinery or equipment, such as a chainsaw or gun which have serial numbers or some sort of identification numbers. The present application is discussed herein with regard to a vehicle, but the present invention should not be limited to a vehicle and could be any device that has identifying elements or numbers/text.

Turning to FIG. 4B, in this figure, the image capture can be of a portion of a vehicle. By capturing at least a portion of the vehicle, the vehicle can be recognized. For example, by capturing the style of the windshield, or the style of the hood, the vehicle may be identified by make, model, year, vehicle information, etc. Other parts of the car may also be recognized. Such as a vehicles tail lights, grill, side panels, and/or the like. For example, the tail lights may be recognized as being specific to one make/model of a vehicle.

It should be understood that the whole vehicle can also be captured, as is illustrated in FIG. 4C. This allows the full vehicle body style to be analyzed to determine the make, model and/or year of the vehicle. Other information can also be determined, such as the paint color, upgrade features, etc.

Also noted in FIG. 4C, the rear of the vehicle may be captured, which may include the reading of the type of car (e.g., Jeep, Ford, etc.). The license plate (or other identifying objects specific to the particular vehicle) may be captured as well.

Capturing of the vehicle allows the user to receive data regarding the vehicle. This data may include, but is not limited to, vehicle pricing, accidents, replacement parts, purchase history, mileage, make, model, year, original color, original specifications, social networking comments about the vehicle, consumer reports reviews, posts of data regarding the vehicle on blogs, magazines, webpages, or the like, and/or the like.

Figure 5:
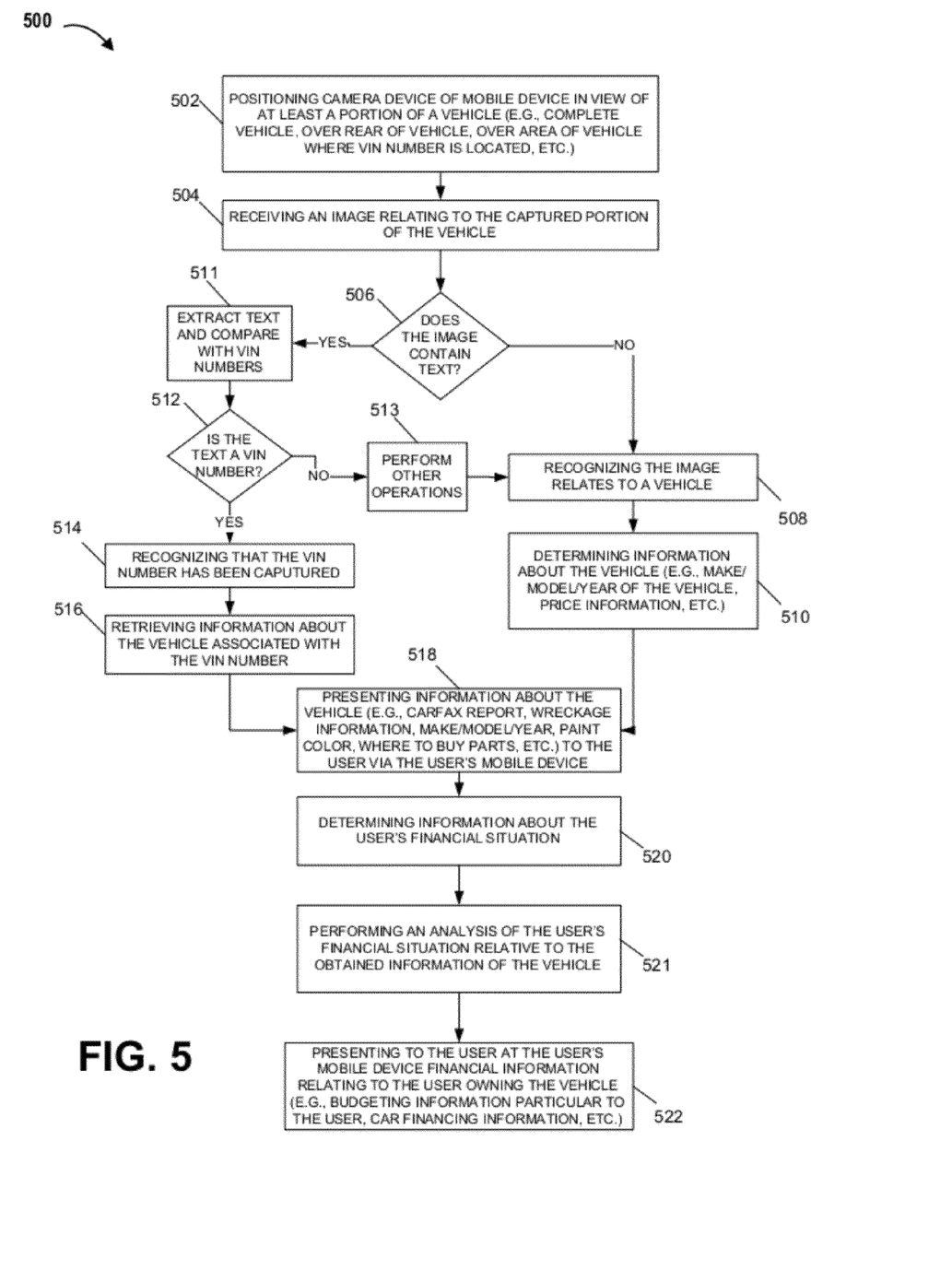
FIG. 5 is a flow chart illustrating method of vehicle recognition, in accordance with embodiments of the invention.

FIG. 5 is a flow chart illustrating method of vehicle recognition 500, in accordance with embodiments of the invention. At block 502 a user may position the camera device of the mobile device in view of at least a portion of a vehicle. A portion of the vehicle may include, but is not limited to the complete vehicle, the rear of the vehicle, the front of the vehicle, a grill, headlight, motor, VIN number, interior, and/or the like. The system may then receive an image relating to the captured portion of the vehicle, in block 504. The captured image may be taken using a real-time video stream or the like, such that a portion of the vehicle may be identified in the image. Next in decision block 506 it is determined whether the image contains text.

In some embodiments, the image contains text. The text, in block 511, may be extracted and compared with vehicle VIN numbers stored in a database. In decision block 512 it is determined if the text in the image matches a VIN number or partial VIN number. If the text does not match a VIN number other operations are performed to determine the vehicle in the captured image, as illustrated in block 513. The text may provide an indication as to the brand, make, model, year, etc. of the vehicle in the captured image. In this way, the system may still be able to utilize the captured text to determine information about the vehicle. If it is determined in decision block 512 that the text is a VIN number, it is first recognized that the number captured is a VIN number in block 514. At that point the system may retrieve the information about the vehicle associated with the VIN number recognized, as illustrated in block 516.

Referring back to decision block 506, if the image does not contain text the system, in block 508 may recognize that the image relates to a vehicle. At that point, in block 510 the system determines information about the vehicle. The information about the vehicle may include, but is not limited to the make, model, year, user history, color, specifications, mileage, price information, accident history, maintenance history, and/or the like.

At block 518, the information about the vehicle from block 510 and the information about the vehicle's VIN number from block 516 converge and information is presented to the user about the vehicle. The information is presented to the user via the user's mobile device. The information presented may include, but is not limited to the make, model, year, user history, color, specifications, mileage, price information, accident history, maintenance history, and/or the like.

In some embodiments, as illustrated in block 520, the system may determine information about the user's financial situation. Then, an analysis of the user's financial situation is performed relative to the information obtained about the vehicle from block 516 and 510, as illustrated in block 521. Once the analysis is completed, it is presented to the user at the user's mobile device. As illustrated in block 522, financial information relating to the user owning the vehicle is presented to the user via his/her mobile device. Financial information relating to the user owning the vehicle may include, but is not limited to budgeting information particular to the user, car financing information, etc.

Thus, methods, systems, computer programs and the like have been disclosed that provide for using real-time video analysis, such as AR or the like to assist the user of mobile devices with commerce activities. Through the use real-time vision object recognition objects, logos, artwork, products, locations and other features that can be recognized in the real-time video stream can be matched to data associated with such to assist the user with commerce activity. The commerce activity may include, but is not limited to; conducting a transaction, providing information about a product/service, providing rewards based information, providing user-specific offers, or the like. In specific embodiments, the data that matched to the images in the real-time video stream is specific to financial institutions, such as customer financial behavior history, customer purchase power/transaction history and the like. In this regard, many of the embodiments herein disclosed leverage financial institution data, which is uniquely specific to financial institution, in providing information to mobile devices users in connection with real-time video stream analysis.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The systems, methods, computer program products, etc. described herein, may be utilized or combined with any other suitable AR-related application. Non-limiting examples of other suitable AR-related applications include those described in the following U.S. Provisional Patent Applications, the entirety of each of which is incorporated herein by reference:

| U.S. Provisional Ser. No. | Filed On | Title |
|---|---|---|
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

What is claimed is:

1. A method for vehicle recognition, the method comprising:

receiving a real-time video stream from a mobile device of a user, wherein the real-time video stream captures at least a portion of a vehicle in proximate location to the mobile device of the user;

identifying, from the real-time video stream of the at least a portion of the vehicle in proximate location to the mobile device of the user;

determining, via a computer device processor, information about the vehicle based on the at least a portion of the vehicle identified from the real-time video stream, wherein information about the vehicle includes the vehicle's make, the vehicle's model, vehicle maintenance history, an estimated monthly vehicle payment, and an indication of whether the user can afford the estimated monthly vehicle payment based on the user's budget;

presenting to the user, via the mobile device, the information about the vehicle, but only while the real-time video stream from the mobile device is still capturing the at least a portion of the vehicle; and superimposing, over the real-time video stream that is still capturing the at least a portion of the vehicle, the information about the vehicle.

2. The method of claim 1, wherein the information about the vehicle further comprises information about the mileage and accident history of the vehicle.

3. The method of claim 1, wherein the information about the vehicle further comprises information relating to user financial data, including either an estimate of the amount remaining in the user's budget after making the estimated monthly vehicle payment or an estimated amount by which the estimated monthly vehicle payment exceeds the user's budget.

4. The method of claim 1, further comprising analyzing user financial data compared to the information about a price of the vehicle to determine user's ability to afford purchasing the vehicle.

5. The method of claim 1, wherein identifying the at least a portion of the vehicle further comprises capturing an image of the VIN number of the vehicle.

6. The method of claim 1, wherein identifying the at least a portion of the vehicle further comprises capturing a real-time video of a portion of the exterior of the vehicle.

7. The method of claim 1, wherein identifying the at least a portion of the vehicle further comprises capturing a real-time video of a portion of the interior of the vehicle.

8. A system for vehicle recognition, the system comprising:
a memory device;
a communication device; and
a processing device operatively coupled to the memory device and the communication device, wherein the processing device is configured to execute computer-readable program code to:
receive a real-time video stream from a mobile device of a user, wherein the real-time video stream captures at least a portion of a vehicle in proximate location to the mobile device of the user;
identify, from the real-time video stream of the at least a portion of the vehicle in proximate location to the mobile device of the user;
determine information about the vehicle based on the at least a portion of the vehicle identified from the real-time video stream, wherein information about the vehicle includes the vehicle's make, the vehicle's model, vehicle maintenance history, an estimated monthly vehicle payment, and an indication of whether the user can afford the estimated monthly vehicle payment based on the user's budget;
present to the user, via the mobile device, the information about the vehicle, but only while the real-time video stream from the mobile device is still capturing the at least a portion of the vehicle; and
superimpose, over the real-time video stream that is still capturing the at least a portion of the vehicle, the information about the vehicle.

9. The system of claim 8, wherein the information about the vehicle comprises information about the mileage and accident history of the vehicle.

10. The system of claim 8, wherein the information about the vehicle further comprises information relating to user financial data, including either an estimate of the amount remaining in the user's budget after making the estimated monthly vehicle payment or an estimated amount by which the estimated monthly vehicle payment exceeds the user's budget.

11. The system of claim 8, further comprising analyzing user financial data compared to the information about a price of the vehicle to determine user's ability to afford purchasing the vehicle.

12. The system of claim 8, wherein identifying the least a portion of the vehicle further comprises capturing an image of the VIN number of the vehicle.

13. The system of claim 8, wherein identifying the at least a portion of the vehicle further comprises capturing a real-time video of a portion of the exterior of the vehicle.

14. The system of claim 8, wherein identifying the at least a portion of the vehicle further comprises capturing a real-time video of a portion of the interior of the vehicle.

15. A computer program product for vehicle recognition, the computer program product comprising at least one non-transitory computer-readable medium having computer-readable program code portions embodied therein, the computer-readable program code portions comprising:
an executable portion configured for receiving a real-time video stream from a mobile device of a user, wherein the real-time video stream captures at least a portion of a vehicle in proximate location to the mobile device of the user;
an executable portion configured for identifying, from the real-time video stream of the at least a portion of the vehicle in proximate location to the mobile device of the user;
an executable portion configured for determining information about the vehicle based on the at least a portion of the vehicle identified from the real-time video stream, wherein information about the vehicle includes the vehicle's make, the vehicle's model, vehicle maintenance history, an estimated monthly vehicle payment, and an indication of whether the user can afford the monthly vehicle payment based on the user's budget;
an executable portion configured for presenting to the user, via the mobile device, the information about the vehicle, but only while the real-time video stream from the mobile device is still capturing the at least a portion of the vehicle; and
an executable portion configured for superimposing, over the real-time video stream that is still capturing the at least a portion of the vehicle, the information about the vehicle.

16. The computer program product of claim 15, wherein the information about the vehicle comprises information about the mileage and accident history of the vehicle.

17. The computer program product of claim 15, wherein the information about the vehicle further comprises information relating to user financial data, including either an estimate of the amount remaining in the user's budget after making the estimated monthly vehicle payment or an estimated amount by which the estimated monthly vehicle payment exceeds the user's budget.

18. The computer program product of claim 15, further comprising analyzing user financial data compared to the information about a price of the vehicle to determine user's ability to afford purchasing the vehicle.

19. The computer program product of claim 15, wherein identifying the at least a portion of the vehicle further comprises capturing an image of the VIN number of the vehicle.

20. The computer program product of claim 15, wherein identifying the at least a portion of the vehicle further comprises capturing a real-time video of a portion of the exterior of the vehicle.

21. The computer program product of claim 15, wherein identifying the at least a portion of the vehicle further comprises capturing a real-time video of a portion of the interior of the vehicle.

* * * * *